United States Patent
Chen et al.

(10) Patent No.: US 6,582,222 B1
(45) Date of Patent: Jun. 24, 2003

(54) FUSING STATION INCLUDING MULTILAYER FUSER ROLLER

(75) Inventors: Jiann-Hsing Chen, Fairport, NY (US); Joseph Pavlisko, Pittsford, NY (US); Robert A. Lancaster, Hilton, NY (US); Nataly Boulatnikov, Rochester, NY (US)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 10/139,464

(22) Filed: May 6, 2002

(51) Int. Cl.$^7$ .................................................. F27B 9/28
(52) U.S. Cl. ........................ 432/60; 219/216; 399/330
(58) Field of Search .................... 432/60, 228; 219/216; 299/330

(56) References Cited

U.S. PATENT DOCUMENTS

| | | | | |
|---|---|---|---|---|
| 4,984,027 A | * | 1/1991 | Derimiggio et al. | 399/331 |
| 5,292,606 A | * | 3/1994 | Fitzgerald | 428/35.8 |
| 5,336,539 A | * | 8/1994 | Fitzgerald | 428/36.8 |
| 5,450,183 A | * | 9/1995 | O'Leary | 399/321 |
| 5,464,698 A | * | 11/1995 | Chen et al. | 428/421 |
| 5,480,724 A | * | 1/1996 | Fitzgerald et al. | 428/447 |
| 5,960,145 A | * | 9/1999 | Sanchez | 385/116 |
| 5,960,245 A | * | 9/1999 | Chen et al. | 399/333 |
| 6,020,038 A | * | 2/2000 | Chen et al. | 428/36.9 |
| 6,127,041 A | * | 10/2000 | Szostek et al. | 428/450 |
| 6,148,170 A | * | 11/2000 | McMindes et al. | 399/330 |
| 6,190,771 B1 | * | 2/2001 | Chen et al. | 428/375 |
| 6,225,409 B1 | * | 5/2001 | Davis et al. | 525/104 |
| 6,302,835 B1 | * | 10/2001 | Davis et al. | 492/59 |
| 6,312,817 B1 | * | 11/2001 | Chen et al. | 428/447 |
| 6,393,247 B1 | * | 5/2002 | Chen et al. | 399/330 |
| 6,393,249 B1 | * | 5/2002 | Aslam et al. | 399/333 |
| 6,447,904 B1 | * | 9/2002 | Davis et al. | 428/379 |
| 6,456,816 B1 | * | 9/2002 | Chowdry et al. | 399/302 |
| 6,463,250 B1 | * | 10/2002 | Chen et al. | 399/330 |

* cited by examiner

Primary Examiner—Jiping Lu (57) ABSTRACT

A fusing station including an externally heated deformable fuser roller and a relatively harder pressure roller, the fuser roller including a heat distribution layer. A fuser roller embodiment includes a core member, a base cushion layer around the core member, a heat storage layer around the base cushion layer, a heat distribution layer around the heat storage layer, and a thin gloss control layer around the heat distribution layer. Ratios of thermal conductivity divided by thickness for the layers are, respectively: for the base cushion layer, less than approximately 13.3 BTU/hr/ft$^2$/°F.; for the heat storage layer, approximately between 300 BTU/hr/ft$^2$/°F.–1400 BTU/hr/ft$^2$/°F.; for the heat distribution layer, approximately between 600 BTU/hr/ft$^2$/°F.–4,800 BTU/hr/ft$^2$/°F.; and, for the gloss control layer, approximately between 600 BTU/hr/ft$^2$/°F.–6,000 BTU/hr/ft$^2$/°F.

58 Claims, 5 Drawing Sheets

FUSING STATION INCLUDING MULTILAYER FUSER ROLLER

FIELD OF THE INVENTION

The invention relates to fusing in electrostatography, and more particularly to an improved fusing station having an externally heated fuser roller for fixing a toner image to a receiver member.

BACKGROUND OF THE INVENTION

In electrostatographic imaging and recording processes such as electrophotographic reproduction, an electrostatic latent image is formed on a primary image-forming member such as a photoconductive surface and is developed with a thermoplastic toner powder to form a toner image. The toner image is thereafter transferred to a receiver member, e.g., a sheet of paper or plastic, and the toner image is subsequently fused or fixed to the receiver member in a fusing station using heat and/or pressure. The fusing station includes a fuser member, which can be a roller, belt or any surface having a suitable shape for fixing thermoplastic toner powder to the receiver member. The fusing step using a roller fuser member commonly includes passing the toned receiver member between a pair of engaged rollers that produce an area of pressure contact known as a fusing nip. In order to form the fusing nip, at least one of the rollers typically includes a compliant or conformable layer. Heat is transferred from at least one of the rollers to the toner in the fusing nip, causing the toner to partially melt and attach to the receiver member. In the case where the fuser member is a deformable heated roller, a resilient elastomeric layer is typically bonded to the core of the roller, with the roller having a smooth outer surface. Where the fuser member is in the form of a belt, e.g., a flexible endless belt that passes around the heated roller, it typically has a smooth outer surface which may also be hardened.

Simplex fusing stations attach toner to only one side of the receiver member at a time. In this type of station, the engaged roller that contacts the unfused toner is commonly known as the fuser roller and is a heated roller. The roller that contacts the other side of the receiver member is known as the pressure roller and is usually unheated. Either or both rollers can have a compliant layer on or near the surface. It is common for one of these rollers to be driven rotatably by an external source while the other roller is rotated frictionally by the nip engagement.

It is known that a resilient fuser roller, when used in conjunction with a harder or relatively non-deformable pressure roller, e.g., in a Digimaster 9110 machine made by Heidelberg Digital LLC, provides easy release of a receiver member from the fuser roller, because the distorted shape of the compliant surface in the nip tends to bend the receiver member towards the relatively non-deformable unheated pressure roller and away from the much more deformable fuser roller. A pressure roller may advantageously be provided with a polymeric outermost coating, such as the pressure roller disclosed in the Chen et al. patent application (U.S. patent application Ser. No. 09/957,992, filed Sep. 21, 2001).

The most common type of fuser roller is internally heated, i.e., a source of heat is provided within the roller for fusing. Such a fuser roller generally has a hollow core, inside of which is located a source of heat, usually a lamp. Surrounding the core can be an elastomeric layer through which heat is conducted from the core to the surface, and the elastomeric layer typically contains fillers for enhanced thermal conductivity.

Less common is an externally heated fuser roller, such as for example used in an Image Source 120 copier marketed by Eastman Kodak Company, which fuser roller is typically heated by surface contact with one or more heating rollers. Externally heated fuser rollers are disclosed by the O'Leary patent (U.S. Pat. No. 5,450,183), the Derimiggio et al. patent (U.S. Pat. No. 4,984,027), the Stack et al. patent application (U.S. patent application Ser. No. 09/680,134, filed Oct. 4, 2000), and the Chen et al. patent application (U.S. patent application Ser. No. 09/680,138, filed Oct. 4, 2000).

A conventional toner fuser roller includes a rigid cylindrical core member, typically metallic such as aluminum, coated with one or more synthetic layers usually formulated with polymeric materials made from elastomers. A resilient base cushion layer, which may contain filler particles to improve mechanical strength and/or thermal conductivity, is typically formed on the surface of the core, which may advantageously be coated with a primer to improve adhesion of the resilient layer. Roller cushion layers are commonly made of silicone rubbers or silicone polymers such as, for example, polydimethylsiloxane (PDMS) polymers of low surface energy, which minimize adherence of toner to the roller, such as disclosed by the Chen et al. patents (U.S. Pat. No. 5,960,145 or U.S. Pat. No. 6,020,038).

Some roller fusers rely on film splitting of low viscosity oil to enable release of the toner and (hence) receiver member from the fuser roller. The oil is typically applied to the surface of the fuser from a donor roller coated with the oil provided from a supply sump. A donor roller is disclosed in the Chen et al. patent (U.S. Pat. No. 6,190,771) and in the Chen et al. patent application (U.S. patent application Ser. No. 09/960,661, filed Sep. 21, 2001).

Release oils (commonly referred to as fuser oils) are composed of, for example, polydimethylsiloxanes. When applied to the fuser roller surface to prevent the toner from adhering to the roller, fuser oils may, upon repeated use, interact with PDMS material included in the resilient layer (s) in the fuser roller, which in time can cause swelling, softening, and degradation of the roller. To prevent these deleterious effects caused by release oil, a thin barrier layer made of, for example, a cured fluoroelastomer and/or a silicone elastomer, is typically formed on the resilient cushion layer, as disclosed in the Davis et al. patent (U.S. Pat. No. 6,225,409).

To rival the photographic quality produced using silver halide technology, it is desirable that electrostatographic multicolor toner images have high gloss. To this end, it is desirable to provide a very smooth fusing member contacting the toner particles in the fusing station. A fuser roller having improved gloss characteristics is disclosed in the Chen et al. patent application (U.S. patent application Ser. No. 09/608,290, filed Jun. 30, 2000). A fluorocarbon thermoplastic random copolymer useful for making a gloss control coating on a fuser roller is disclosed in the Chen et al. patent application (U.S. patent application Ser. No. 09/609,561, filed Jun. 30, 2000).

In the fusing of the toner image to the receiver member, the area of contact of a conformable fuser roller with the toner-bearing surface of a receiver member sheet as it passes through the fusing nip is determined by the amount pressure exerted by the pressure roller and by the characteristics of the resilient cushion layer. The extent of the contact area helps establish the length of time that any given portion of the toner image will be in contact with and heated by the fuser roller.

As previously mentioned, PDMS cushion layers may include inorganic particulate fillers, such as for example made of metals, metal oxides, metal hydroxides, metal salts, and mixtures thereof. The Fitzgerald patent (U.S. Pat. No. 5,292,606) describes fuser roller base cushion layers that contain fillers of particulate zinc oxide and zinc oxide-aluminum oxide mixtures. Similarly, the Fitzgerald patent (U.S. Pat. No. 5,336,539) describes a fuser roller cushion layer containing dispersed nickel oxide particles. Also, the fuser roller described in the Fitzgerald et al. patent (U.S. Pat. No. 5,480,724) includes a base cushion layer containing 20 to 40 volume percent of dispersed tin oxide particles.

Filler particles may also be included in a barrier layer. For example, the Chen et al. patent (U.S. Pat. No. 5,464,698) discloses a toner fuser member having a silicone rubber cushion layer and an overlying barrier layer of a cured fluorocarbon polymer in which is dispersed by a filler comprising a particulate mixture that includes tin oxide.

The Chen et al. patents (U.S. Pat. No. 5,960,145 or U.S. Pat. No. 6,020,038,) disclose an improved fuser roller including three concentric layers each containing a particulate filler, i.e., a base cushion layer made from a condensation-cured PDMS, a barrier layer covering the base cushion made of a cured fluorocarbon polymer, and an outer surface layer made of an addition-cured PDMS, with particulate fillers in the layers including one or more of aluminum oxide, iron oxide, calcium oxide, magnesium oxide, tin oxide, and zinc oxide. The barrier layer may include a Viton™ elastomer (sold by DuPont) or a Fluorel™ elastomer (sold by Minnesota Mining and Manufacturing).

Prior art internally heated conventional fuser rollers typically have one or more synthetic polymeric layers including a deformable layer such as a base cushion layer surrounding a hollow metallic core member, with a source of heat such as a lamp provided within the hollow core member. Such fuser rollers rely on thermal conductivity through the synthetic layers for conduction of heat from the internal source of heat to the surface of the roller so as to provide heat for fusing toner particles to receiver members. The thermal conductivity, attainable by the use of one or more suitable particulate fillers, is determined by the filler concentration. The thermal conductivity of most polymers is very low and the thermal conductivity generally increases as the filler concentration is increased. However, if the filler concentration is too high, the mechanical properties of a polymer are usually compromised. For example, the stiffness of the synthetic layers may be increased by too much filler so that there is insufficient deformability to create a wide enough nip for proper fusing. Moreover, too much filler will cause the synthetic layers to have a propensity to delaminate or crack or otherwise cause failure of the roller. Because the mechanical requirements of such an internally heated fuser roller require that the filler concentrations be moderate, the ability of the roller to transport heat is thereby limited. In fact, the concentration of filler in prior art internally heated deformable fuser rollers has reached a practical maximum. As a result, the number of copies that can be fused per minute is limited, and this in turn can be the limiting factor in determining the maximum throughput rate achievable in an electrostatographic printer. There is a need, therefore, to provide an improved fusing station for increasing the increasing the number of prints that can be fused per minute, thereby providing opportunity for higher machine productivity.

An auxiliary internal source of heat may optionally be used with an externally heated fuser roller, e.g., as disclosed in the Stack et al. patent application (U.S. patent application Ser. No. 09/680,134) and in the Chen et al. patent application (U.S. patent application Ser. No. 09/680,138). Such an internal source of heat is known to be useful when the fusing station is quiescent and/or during startup when relatively cold toned receiver members first arrive at the fusing station for fusing therein. It will be evident from the preceding paragraph above that in order for such an auxiliary internal source of heat to be effective (when intermittently needed) the fuser roller must have a sufficiently large thermal conductivity. However, this requirement conflicts with a need to keep heat at the surface of an externally heated fuser roller, i.e., so as not to unnecessarily conduct heat into the interior which would compromise the fusing efficiency of the roller.

Thus there remains a need to provide an improved efficiency fusing station so that the throughput rate can be increased over that of prior art. In particular, there remains a need for an externally heated fuser roller having a minimized rate of thermal conduction to the interior of the roller in conjunction with an improved distribution and storage of heat near the surface of the roller.

SUMMARY OF THE INVENTION

Accordingly, the invention is directed to a fusing station for fusing toner images to receiver members, the fusing station including an elastically deformable fuser member in pressure engagement with a relatively harder pressure roller, the fuser member incorporating a heat distribution layer, and the fuser member heated by an external source of heat.

One embodiment of the deformable fuser member is a fuser roller which includes: an annular base cushion layer around a rigid cylindrical core member with an annular heat storage layer around the base cushion layer, the heat distribution layer as an annulus around the heat storage layer and an outer annular gloss control layer around the heat distribution layer. The fuser roller also optionally includes an auxiliary intermittently activated internal source of heat. The base cushion layer is relatively thermally insulative, the heat storage layer is relatively thermally conductive, and the heat distribution layer is at least as thermally conductive as the base cushion layer. The base cushion layer preferably has a thermal conductivity less than approximately 0.2 BTU/hr/ft/°F., the heat storage layer preferably has a thermal conductivity in a range of approximately between 0.3 BTU/hr/ft/°F.–0.7 BTU/hr/ft/°F., the heat distribution layer preferably has a thermal conductivity in a range of approximately between 0.2 BTU/hr/ft/°F.–0.4 BTU/hr/ft/°F., and the gloss control layer preferably has a thermal conductivity in a range of approximately between 0.10 BTU/hr/ft/°F.–0.15 BTU/hr/ft/°F. For this embodiment, a ratio of thermal conductivity divided by thickness for the base cushion layer has a preselected value in a range of less than approximately 13.3 BTU/hr/ft$^2$/°F., a ratio of thermal conductivity divided by thickness for the heat storage layer has a preselected value preferably in a range of approximately between 300 BTU/hr/ft$^2$/°F.–1400 BTU/hr/ft$^2$/°F., a ratio of thermal conductivity divided by thickness for the heat distribution layer has a preselected value preferably in a range of approximately between 600 BTU/hr/ft$^2$/°F.–4,800 BTU/hr/ft$^2$/°F., and a ratio of thermal conductivity divided by thickness for the gloss control layer has a preselected value preferably in a range of approximately between 600 BTU/hr/ft$^2$/°F.–6,000 BTU/hr/ft$^2$/°F.

An alternative embodiment of the externally heated deformable fuser member is a roller which contains no heat storage layer and yet which includes a compensatingly thicker heat distribution layer, the fuser roller including an annular base cushion layer around a rigid cylindrical core member, the annular heat distribution layer around the base cushion layer, and a thin outer annular gloss control layer around the heat distribution layer. The other layers are entirely similar to those of the previous embodiment. In this alternative embodiment, the heat distribution layer has a thermal conductivity at least as great as that of the base cushion layer. The heat distribution layer preferably has a thermal conductivity in a range of approximately between 0.3 BTU/hr/ft/°F.–0.7 BTU/hr/ft/°F., and a ratio of thermal conductivity divided by thickness for the heat distribution layer has a preselected value preferably in a range of approximately between 240 BTU/hr/ft$^2$/°F.–1680 BTU/hr/ft$^2$/°F.

In yet other alternative embodiments, there is no internal source of heat, and the base cushion layer is more thermally insulative than in the previous embodiments. In these yet other alternative embodiments, a thermal conductivity of the base cushion layer is preferably less than or equal to 0.08 BTU/hr/ft/°F., and a ratio of thermal conductivity divided by thickness for the base cushion layer has a preselected value preferably less than approximately 5.3 BTU/hr/ft$^2$/°F. In all other respects, these yet other alternative embodiments are similar to the previous embodiments.

The heat distribution layer included in all embodiments of the externally heated deformable fuser roller provides a fusing efficiency greater than that of a comparison roller having no heat distribution layer, which fusing efficiency allows a process speed approaching a range of about 600–640 mm/sec, i.e., approaching a throughput of up to approximately 140–150 receiver sheets with dimensions of 8.5"×11" per minute through the fusing station.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings, in some of which the relative relationships of the various components are illustrated, it being understood that orientation of the apparatus may be modified. For clarity of understanding of the drawings, relative proportions depicted or indicated of the various elements of which disclosed members are comprised may not be representative of the actual proportions, and some of the dimensions may be selectively exaggerated.

DETAILED DESCRIPTION OF THE INVENTION

Fusing stations and fuser rollers for use therein according to this invention are readily includable in typical electrostatographic reproduction machines of many types, such as for example electrophotographic color printers.

The invention relates to an electrostatographic reproduction or printing machine for forming a toner image on a receiver member and utilizing a fusing station employing a deformable fuser member for thermally fusing or fixing the toner image to a receiver member, e.g., of paper. The deformable fuser member can be a roller, belt, or any surface having a suitable deformable shape for fixing thermoplastic toner powder to the receiver member. The fusing station preferably includes two rollers which are engaged to form a fusing nip in which an elastically deformable fuser roller comes into direct contact with an unfused toner image as the receiver member is being frictionally moved through the nip. The fuser roller is heated by an external source of heat, such as by direct contact with one or more heating rollers. Alternatively, the fuser roller may be heated via absorbed radiation, e.g., as provided by one or more lamps, or by any other suitable external source of heat. The toner image in an unfused state may include a single-color toner or it may include a composite image of at least two single-color toner images, e.g., a full color composite image made for example from superimposed black, cyan, magenta, and yellow single-color toner images. The unfused toner image is previously transferred, e.g., electrostatically, to the receiver member from one or more toner image bearing members such as primary image-forming members or intermediate transfer members. It is well established that for high quality electrostatographic color imaging with dry toners, small toner particles are necessary.

The fusing station and fuser roller of the invention are suitable for the fusing of dry toner particles having a mean volume weighted diameter in a range of approximately between 2 mm–9 mm, and more typically, about 7 mm–9 mm, but the invention is not restricted to these size ranges. The fusing temperature to fuse such particles included in a toner image on a receiver member is typically in a range 100° C.–200° C., and more usually, 140°–180° C., but the invention is not restricted to these temperature ranges.

The electrostatographic reproduction or printing may utilize a photoconductive electrophotographic primary image-forming member or a non-photoconductive electrographic primary image-forming member. Particulate dry or liquid toners may be used.

Figure 1:
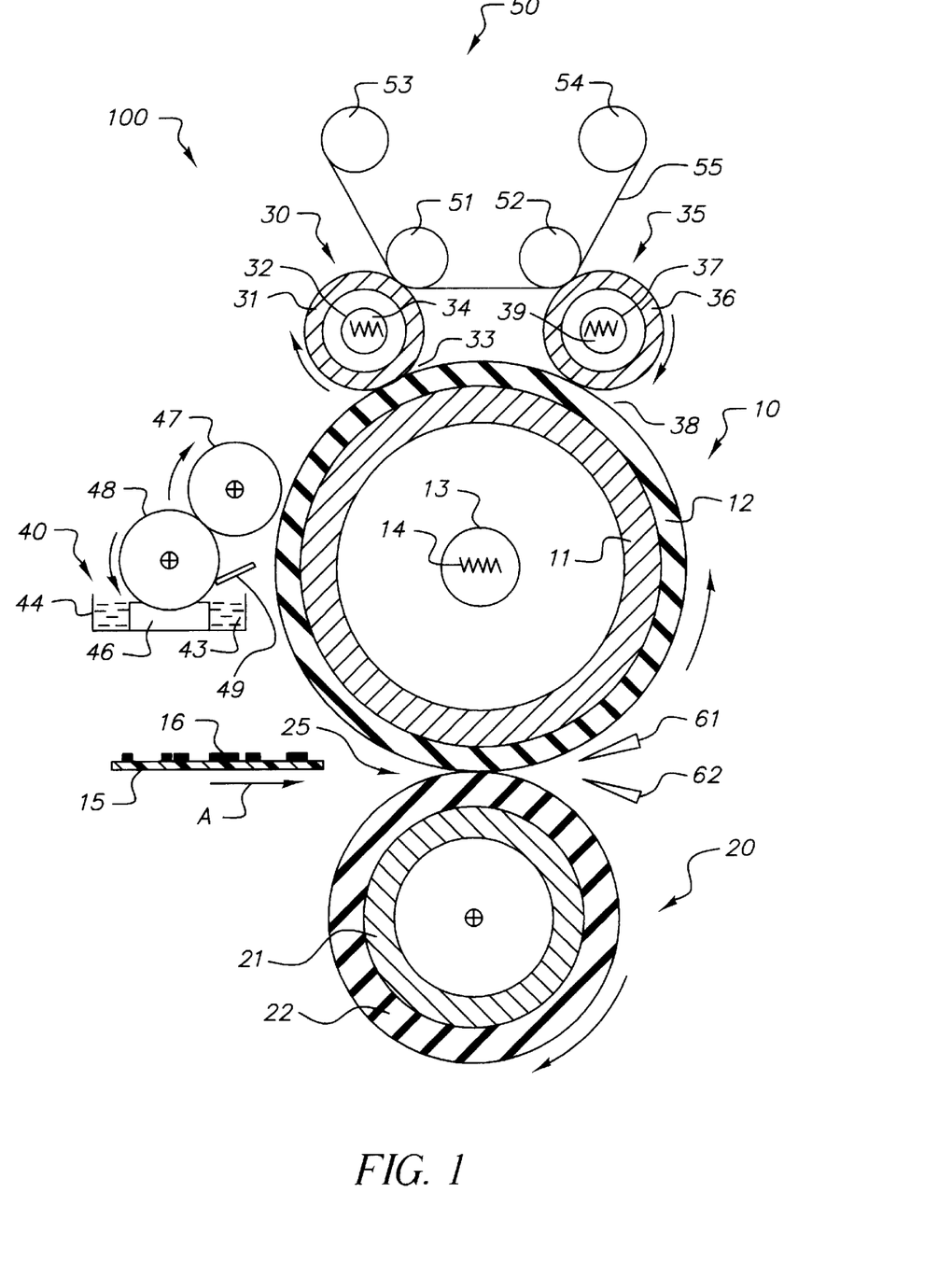
FIG. 1 shows in a side elevational view a fusing station of the invention including a multilayer externally heated fuser roller incorporating a heat distribution layer.

Turning now to the figures, FIG. 1 illustrates a simplex fusing station of the invention, indicated by the numeral 100. The fusing station includes an externally heated, elastically deformable fuser roller 10, engaged under pressure with a relatively harder, i.e., relatively nondeformable, pressure roller 20 so as to form a fusing nip 25. The fuser roller, described in detail below, is a multilayer roller incorporating a heat distribution layer. Fuser roller 10 is externally heated by direct contact with one or more heating rollers, e.g., rollers 30 and 35. (Pressure roller 20, though not heated by any dedicated internal or external source of heat, is generally indirectly heated to a certain extent via contact in the nip 25). A receiver member 15 carrying an unfused toner image 16 is shown moving in direction of arrow A towards the fusing nip 25 for passage therethrough. Receiver member 15 is made of any suitable material, e.g., of paper or plastic, and the receiver member can be in cut sheet form (as depicted) or be a continuous web.

Fuser roller 10 generally includes a rigid, cylindrical, core member 11, around which is a deformable annular structure 12 including at least one elastomeric layer. The core member 11 is preferably made of a thermally conductive material such as a metal, preferably aluminum, and the core member is typically (but not necessarily) hollow as shown. Preferably an outer diameter of the core member is in a range between about 5 inch and 7 inch, and the outer diameter is more preferably about 6.0 inch. In certain embodiments, the deformable annular structure 12 includes an elastomeric deformable base cushion layer closest to core member 11, a flexible heat storage layer around the base cushion layer, a flexible heat distribution layer around the heat storage layer, and, a thin flexible outermost gloss control layer (release layer) around the heat storage layer (individual layers of structure 12 not separately shown—see FIGS. 2 and 4). In alternative embodiments not including a heat storage layer (see FIGS. 3 and 5) the deformable annular structure 12 includes an elastomeric base cushion layer closest to core member 11, a flexible heat distribution layer around the base cushion layer, and, a thin flexible outermost gloss control layer (release layer) around the heat distribution layer. In the above embodiments, it is important that a thermal conductivity of a heat storage layer is greater than a thermal conductivity of the corresponding base cushion layer, and a thermal conductivity of a heat distribution layer is at least as great as the thermal conductivity of the corresponding base cushion layer.

Preferably, the individual layers of structure 12 are successively coated on the core member 11 by using suitable coating techniques and post-coating curings and grindings of each successive layer as may be necessary. The outer release layer (gloss control layer) is preferably made of a low surface energy material such as for example a polyfluorocarbon, and preferably has a very smooth surface suitable for glossing the fused toner image. Preferably, the total thickness of the deformable annular structure 12 is in a range of approximately 0.180 inch–0.240 inch, although a total thickness outside of this range is not excluded.

For the base cushion layer and for the other layers included in the deformable annular structure 12, any suitable heat resistant materials for elevated temperature applications may be used, such as for example rubbers and synthetic polymeric materials, with the layers including appropriate thermal-conductivity-enhancing fillers. Of key significance are the relative thermal conductivities of the various layers included in structure 12. It is a feature of the invention that the heat storage layer (when present) is more thermally conductive than the base cushion layer, and the heat distribution layer is at least as thermally conductive as the base cushion layer. Although a wide range of thermal conductivities can be used to satisfy these requirements, it is preferred that the base cushion layer of the fuser roller has a thermal conductivity less than approximately 0.2 BTU/hr/ft/°F., the heat storage layer (when present) has a thermal conductivity in a range of approximately between 0.3 BTU/hr/ft/°F.–0.7 BTU/hr/ft/°F., and the heat distribution layer has a thermal conductivity in a range of approximately between 0.2 BTU/hr/ft/°F.–0.7 BTU/hr/ft/°F.

It is important to have a contact width in nip 25 which is large so as to effect efficient transfer of heat from fuser roller 10 to the toner image 16. The contact width in nip 25 is preferably in a range of approximately between 15 mm–25 mm, and more preferably, 17 mm–19 mm.

Pressure roller 20 includes a rigid, cylindrical, core member 21 around which is an annular structure 22 including one or more layers, with the core member 21 usually made of a metal, preferably aluminum, and typically (but not necessarily) hollow as shown. Preferably an outer diameter of the core member 21 is in a range between about 3 inch and 4 inch, and the outer diameter is more preferably about 3.5 inch. A preferred annular structure 22 includes a resilient base cushion layer and an outer layer around the base cushion layer (individual layers of structure 22 not separately shown). The base cushion layer of annular structure 22 preferably has a thickness in a range of approximately between 0.18 inch and 0.22 inch, and the thickness is more preferably about 0.20 inch. The base cushion layer of structure 22 can for example be made of a commercially available condensation-crosslinked PDMS elastomer which contains about 32–37 volume percent aluminum oxide filler and about 2–6 volume percent iron oxide filler, sold by Emerson and Cuming (Lexington, Mass.) under the trade name EC 4952. Preferably the base cushion layer of structure 22 is coated on the core member 21 and the outer layer of structure 22 is formed as a topcoat layer on the underlying base cushion layer, with the topcoat layer preferably made of a fluorocarbon thermoplastic random copolymer (FLC) material such as for example the copolymer of vinylidene fluoride, tetrafluoroethylene and hexafluoropropylene disclosed in the Chen et al. patent application (U.S. patent application Ser. No. 09/609,561, filed Jun. 30, 2000). The topcoat layer thickness is preferably in a range of approximately between 0.001 inch–0.004 inch, and more preferably 0.0020 inch–0.0025 inch. A suitable pressure roller 20 is preferably similar to the pressure roller disclosed in the Chen et al. patent application (U.S. patent application Ser. No. 09/957,992, filed Sep. 21, 2001). Due to the incorporated fillers, the EC 4952 material usable for the base cushion layer of structure 22 has a relatively high nominal thermal conductivity of about 0.35 BTU/hr/ft/°F. However, the thermal conductivity of the base cushion layer of structure 22 is not critical to the operation of fusing station 100. In certain circumstances, a considerably lower thermal conductivity of the base cushion layer of structure 22 may be preferable so as not to drain too much heat from the contact zone of nip 25. A preferred base cushion layer of pressure roller 20 is made of an elastomeric material having any suitable thermal conductivity, which elastomeric material has a Shore A hardness greater than about 50, preferably greater than about 60. The base cushion layer may include a particulate filler.

The external heating roller 30 is preferably a hard, thermally conductive, roller. It is preferred that roller 30 be made of an annular aluminum member 31 with the outer surface (in contact with fuser roller 10) being preferably anodized. Within the interior hollow of member 31 is a source of heat, which source of heat is preferably a tubular heating lamp 32 coaxially located along the central longitudinal axis of member 31. Ohmic heating of filament 34 included in lamp 32 is controlled by a programmable power supply (not shown) so as to provide variable heating power, either continuously or intermittently. Any suitable outer diameter of roller 30 may be used, with a preferred outer diameter being in a range between approximately 0.75 inch–2.0 inch, more preferably about 1.0 inch. Heating roller 35 includes member 36 and lamp 37 which are respectively entirely similar to member 31 and lamp 32 of roller 30, with a filament 39 of lamp 37 similarly controlled by a programmable power supply (not shown). Both rollers 30 and 35 are frictionally driven by the fuser roller 10 and are engaged under pressure to form respective heating nips 33 and 38. The contact zone of each of nips 33 and 38 has a width, which is preferably in a range of approximately between 10 mm–12 mm, and more preferably about 11 mm. The operating temperature of heating rollers 30 and 35 results in a surface temperature of the fuser roller 10 which is preferably in a range of approximately between 140° C.–170° C., with the required surface temperature in this range being dependent on the thickness of the receiver members passing through nip 25. These surface temperatures are suitable for well known polyester toners yet may require small adjustments for different types of toners or unusual receiver member materials.

The required surface temperatures for the heating rollers 30 and 35 are dependent upon the process speed of receivers through fusing nip 25, as disclosed below in relation to different embodiments of the invention. The surface temperatures of the heating rollers 30 and 35 and the fuser roller 10 are preferably measured by any suitable temperature sensing devices external to the rollers (not shown), such as for example contacting sensors, e.g., NTC type sensors, in contact with each of the fuser roller and heating rollers. Alternatively, non-contacting temperature sensors, e.g., infrared sensors, can be used with any of these rollers. Preferably, each temperature-sensing device can be connected to a controller (not shown) for controlling the surface temperature of the respective roller.

A heating-roller-cleaning station 50 includes a cleaning web 55 for cleaning the surface of the fuser roller 10, a take-out spool 53 from which web 55 is unwindable, and a take-up spool 54 upon which web 55 is windable. The heating-roller-cleaning station 50 further includes pressure backup rollers 51 and 52 for tensing the cleaning web 55 against the respective heating rollers 30 and 35. Alternatively, a single backup roller may be used (not illustrated) which presses against both the heating rollers 30 and 35. Web 50 is typically a single-use web such that the entire cleaning web is discarded when the take-out spool 53 is exhausted. The web 50 may be made of any suitable material, such as for example a polyethyleneterephthalate (PET) woven fiber sold under the tradename Nomex from DuPont.

Operating in conjunction with fusing roller 10 is an oiling roller mechanism 40 including a wick 46 in contact with a liquid release agent (e.g., fuser oil) 43 contained in reservoir 44. Wick 46 absorbs the release agent 43 and transfers the release agent to a metering roller 48, with the amount of release agent on the surface of roller 48 controlled by blade 49. Metering roller 48 is in contact with a release-agent-donor roller 47, which release-agent-donor roller contacts fuser roller 10 and thereby delivers to the surface of the fuser roller a continuous flow of release agent 43. A preferred donor roller is similar to that of the cited Chen et al. patent application (U.S. patent application Ser. No. 09/960,661, filed Sep. 21, 2001). Approximately 1–20 milligrams of release agent is needed for each receiver member (e.g., receiver member sheet 15) passing through nip 25. As is well known, a suitable release agent is typically a silicone oil. A preferred polymeric release agent 43 for use in fusing station 100 is an amine-functionalized polydimethylsiloxane having a preferred viscosity of about 300 centipoise as disclosed in the Chen et al. patent (U.S. Pat. No. 6,190,771). A suitable release-agent-donor roller 47 for use in fusing station 10 includes for example a hollow aluminum core of outer diameter about 0.875 inch, the core coated by a cushion layer about 0.230 inch thick made of a compliant material having a low thermal conductivity such as for example obtainable commercially as S5100 from Emerson and Cuming (Lexington, Mass.), with a release layer about 0.0025 inch thick coated on the cushion layer (individual layers not illustrated in FIG. 1). The release layer can be made from an interpenetrating network composed of a crosslinked fluoroelastomer and two different silicone elastomers such as disclosed in the Davis et al. patent (U.S. Pat. No. 6,225,409). More preferably, the release layer is made of a copolymer of vinylidene fluoride, tetrafluoroethylene and hexafluoropropylene as disclosed in the Chen et al. patent application (U.S. patent application Ser. No. 09/609,561, filed Jun. 30, 2000). Any suitable dimensions of the core, cushion layer, and release layer may be used.

In lieu of the oiling roller mechanism 40, an oiling web mechanism (not illustrated) may be used, the oiling web mechanism including a movable fuser-oil-impregnated donor web pressed against fuser roller 10 by using one or more backup rollers.

Within the interior hollow of core member 11 is an optional auxiliary intermittently activated source of heat, which internal source of heat is preferably a tubular heating lamp 13 coaxially located along the central longitudinal axis of core member 11, the lamp 13 including a filament 14. Intermittent or variable ohmic heating (as may be required) of filament 14 is controllable by a programmable power supply (not shown). The optional auxiliary intermittently activated source of heat or lamp 13 can be used so as to augment or supplant the heating provided by the external heating rollers 30 and 35. For example, the lamp 13 can be turned on when an electrostatographic printer is in standby mode in order to keep the fuser roller 10 suitably warm, so that when the printer is restarted the heating rollers 30 and 35 can rapidly restore steady state thermal conditions for fusing. Conversely, when steady state has been achieved after a start-up, any auxiliary heating may be reduced or shut off as may be necessary. The lamp 13 can also be suitably activated so as to avoid a fusing defect known as "droop", which is the result of inadequate fusing caused by a thermal transient when cold receiver members first enter the fusing nip 25 after start-up of the printer after a stand-by or a shutdown.

A release aid mechanism such as for example air knives 61 and 62 can be provided to aid release of a fused receiver member after passage of the receiver member through the fusing nip 25, with pressured air from air knife 61 generally directed towards the surface of fuser roller 10 and pressured air from air knife 62 generally directed towards the surface of pressure roller 20. Alternatively, any suitable release aid mechanism for preventing the fused receiver member from wrapping on one or other of rollers 10 and 20 may be used, including skives, blades, and so forth.

Figure 2:
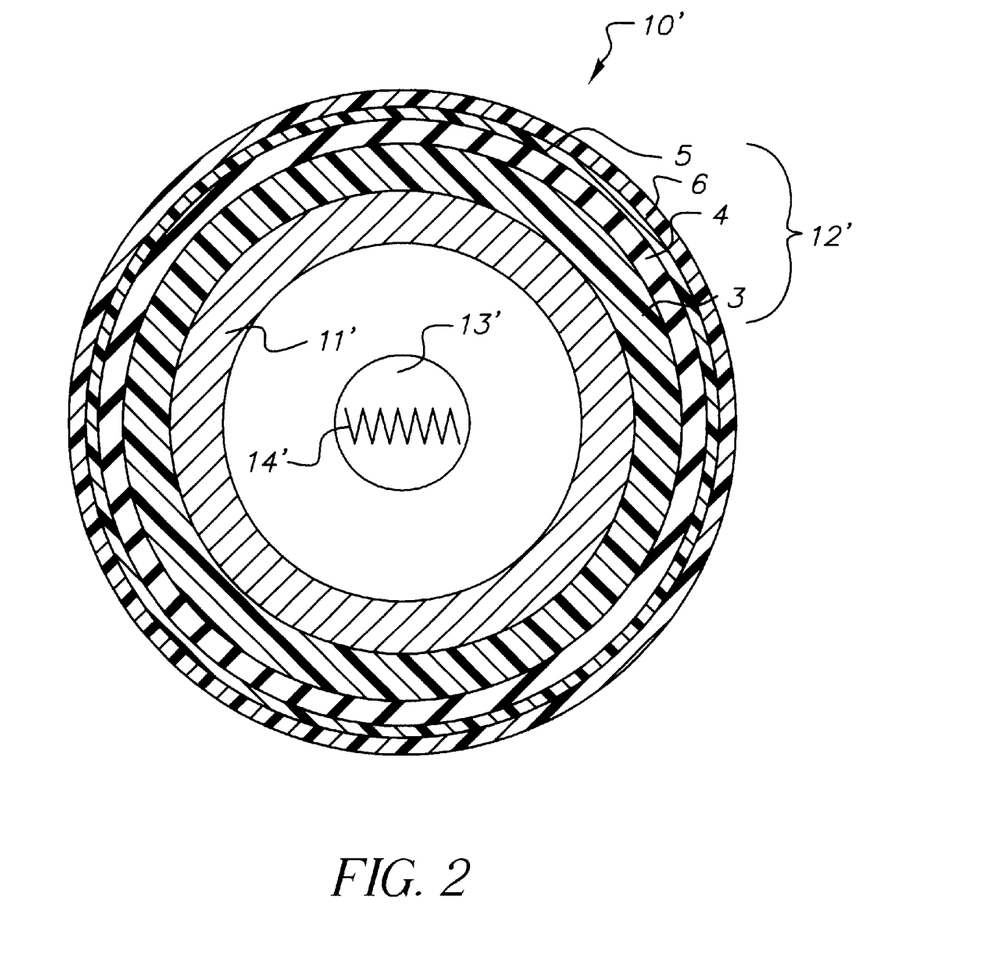
FIG. 2 shows, in an axially directed view, concentric layers of an embodiment of the multilayer externally heated fuser roller of FIG. 1.

FIG. 2 shows an axial view cross section of an embodiment 10' of a fuser roller for use in fusing station 100. Elements having a prime (') in FIG. 2 refer to the corresponding unprimed elements in FIG. 1. The optional auxiliary intermittently activated source of heat is a lamp 13' which is entirely similar to the lamp 13 described above, and the core member 11' is preferably thermally conductive and otherwise entirely similar to core member 11. In the embodiment 10', the elastically deformable annular structure 12' is a 4-layer structure including a base cushion layer 3 around the core member 11', a heat storage layer 4 around the base cushion layer, a heat distribution layer 5 around the heat storage layer, and a gloss control layer 6 around the heat distribution layer.

The base cushion layer (BCL) 3 is preferably formed on the core member 11' by any suitable coating method, with the BCL having a thermal conductivity preferably less than approximately 0.2 BTU/hr/ft/°F., and more preferably less than approximately 0.1 BTU/hr/ft/°F. Base cushion layer 3 may be made of any suitable resilient elastomeric material, such as for example a highly crosslinked polyorganosiloxane and may include a particulate filler. The filler is preferably primarily a structural filler for strengthening the base cushion layer, and the filler may further include a minority proportion of thermally conductive particles, such as for example particles of ferric oxide. The structural filler particles are made of materials such as mineral silica particles, fumed silica, and the like. The total weight percentage of filler in BCL 3 is preferably less than about 30% w/w, and more preferably is in a range of approximately between 10% w/w–20% w/w. A filler in base cushion layer 3 preferably has a particle size in a range of approximately between 0.1 $\mu$m–20 $\mu$m, and more preferably 0.5 $\mu$m–10 $\mu$m. The base cushion layer 3 may have any suitable thickness. Preferably, the thickness of BCL 3 is in a range of approximately between 0.180 inch–0.250 inch, and more preferably, 0.190 inch–0.195 inch. For this embodiment, a ratio $R_{BCL}$, defined as thermal conductivity of BCL 3 divided by thickness of BCL 3, has a preselected value which is preferably less than approximately 13.3 BTU/hr/ft$^2$/°F., and more preferably less than approximately 6.7 BTU/hr/ft$^2$/°F.

The heat storage layer (HSL) 4 is made from any suitable elastomeric material, such as for example a polydimethylsiloxane, and preferably formed on the base cushion layer 3 by any suitable coating method. Heat storage layer 4 generally has a much higher thermal conductivity than that of base cushion layer 3, such that a ratio of a thermal conductivity of HSL 4 divided by the thermal conductivity of BCL 3 has a preselected value preferably greater than approximately 1.5, and more preferably this preselected value is in a range of approximately between 1.5–7. Although a wide range of thermal conductivities can be used to satisfy this requirement, the heat storage layer 4 preferably has a thermal conductivity in a range of approximately between 0.3 BTU/hr/ft/°F.–0.7 BTU/hr/ft/°F., and more preferably between 0.32 BTU/hr/ft/°F.–0.45 BTU/hr/ft/°F. Heat storage layer 4 includes a particulate filler, which is aluminum oxide, iron oxide, calcium oxide, magnesium oxide, nickel oxide, tin oxide, zinc oxide, or mixtures thereof. This filler preferably includes particles having a mean diameter in a range of approximately between 0.1 micrometer–100 micrometers, and more preferably, 0.5 micrometer–40 micrometers. The filler preferably occupies about 10 to 60 volume percent of the heat storage layer, and more preferably, about 20 to 40 volume percent of the heat storage layer 4. The heat storage layer 4 may have any suitable thickness. Preferably, the thickness of HSL 4 is in a range of approximately between 0.006 inch–0.012 inch, and more preferably, 0.0075 inch–0.0085 inch. A ratio $R_{HSL}$, defined as thermal conductivity of HSL 4 divided by thickness of HSL 4, has a preselected value preferably in a range of approximately between 300 BTU/hr/ft$^2$/°F.–1,400 BTU/hr/ft$^2$/°F., and more preferably 450 BTU/hr/ft$^2$/°F.–720 BTU/hr/ft$^2$/°F.

The heat distribution layer (HDL) 5 is preferably formed on the heat storage layer 4 by any suitable coating method including ring coating and blade coating. Heat distribution layer 5 is preferably made of a chemically unreactive, flexible, polymeric material suitable for high temperature use, such as for example a fluoropolymer. A preferred polymeric material for inclusion in HDL 5 is a fluorocarbon thermoplastic random copolymer (FLC) material such as for example the copolymer of vinylidene fluoride, tetrafluoroethylene and hexafluoropropylene as disclosed in the Chen et al. patent application (U.S. patent application Ser. No. 09/609,561, filed Jun. 30, 2000), the FLC random copolymer having subunits of:

—(CH$_2$CF$_2$)x-, —(CF$_2$CF(CF$_3$))y-, and —(CF$_2$CF$_2$)z-, wherein,
x is from 1 to 50 or 60 to 80 mole percent,
y is from 10 to 90 mole percent,
z is from 10 to 90 mole percent,
x+y+z equals 100 mole percent.

The heat distribution layer 5 may have any suitable thickness and may include one or more particulate fillers. It is preferred that the one or more particulate fillers in HDL 5 include the following materials: zinc oxide, stannic oxide, graphite, or polytetrafluoroethylene (PTFE) particles. However, in substitution of or in addition to the aforementioned one or more particulate fillers, any other particulate filler material may be included in HDL 5, either singly or in combination. For a polymeric heat distribution layer 5 it is generally necessary for good thermal conductivity to keep the filler concentration relatively high. A filler used in the formulation of HDL 5 preferably has a particle size in a range of approximately between 0.1 $\mu$m–10 $\mu$m, and more preferably 0.1 $\mu$m–2.0 $\mu$m. The total concentration of all fillers included in HDL 5 is preferably in a range of approximately between 40%–70% by weight, and more preferably, 50%–60% by weight. Specifically, in a preferred formulation of HDL 5 which includes zinc oxide, stannic oxide, graphite, or polytetrafluoroethylene (PTFE) particles, the concentration of zinc oxide is in a range of approximately between 1%–3% w/w, the concentration of stannic oxide is in a range of approximately between 35%–45% w/w, the concentration of graphite is in a range of approximately between 6%–10% w/w, and the concentration of PTFE particles is in a range of approximately between 3%–5% w/w. Preferably, the thickness of the heat distribution layer 5 is in a range of approximately between 0.001 inch–0.004 inch, and more preferably 0.0010 inch–0.0020 inch.

It is a feature of this invention that the heat distribution layer is at least as thermally conductive as the base cushion layer. For embodiment 10, a ratio of a thermal conductivity of the heat distribution layer 5 divided by a thermal conductivity of the base cushion layer 3 has a preselected value preferably greater than 1, and more preferably this preselected value is in a range of approximately between 1–4. Although a wide range of thermal conductivities can be used to satisfy this requirement, preferably the thermal conductivity of HDL 5 is in a range of approximately between 0.2 BTU/hr/ft/°F.–0.4 BTU/hr/ft/°F., and more preferably 0.25 BTU/hr/ft/°F.–0.35 BTU/hr/ft/°F. A ratio $R_{HDL}$, defined as thermal conductivity of HDL 5 divided by thickness of HDL 5, has a preselected value which is preferably in a range of approximately between 600 BTU/hr/ft$^2$/°F.–4,800 BTU/hr/ft$^2$/°F., and more preferably in a range of approximately between 1,500 BTU/hr/ft$^2$/°F.–4,200 BTU/hr/ft$^2$/°F.

The gloss control or outer release layer 6 is preferably formed on the heat distribution layer 5 by any suitable coating method including ring coating and blade coating. As is the case for the heat distribution layer 5, gloss control layer (GCL) 6 is preferably made with a chemically unreactive, low surface energy, flexible, polymeric material suitable for high temperature use, such as for example a fluoropolymer. A preferred polymeric material for inclusion in GCL 6 is the same fluorocarbon thermoplastic random copolymer (FLC) material used for layer 5. The gloss control layer 6 may have any suitable thickness and may include one or more particulate fillers. It is preferred that the one or more particulate fillers in GCL 6 include the following materials: zinc oxide, stannic oxide, carbon black, or polytetrafluoroethylene (PTFE) particles. However, in substitution of or in addition to the aforementioned one or more particulate fillers, any other particulate filler material may be included in layer 6, either singly or in combination. It is necessary for good glossing of a toner image to keep the size of the filler particles small, so that a matte effect on the toner image due to filler particles at the surface of gloss control layer 6 can be minimized. A filler used in the formulation of GCL 6 preferably has a particle size in a range of approximately between 0.1 µm–10 µm, and more preferably 0.1 µm–2.0 µm. The total concentration of all fillers included in GCL 6 is preferably in a range of approximately between 15% by weight–35% by weight, and more preferably 20% by weight–30% by weight. Specifically, in a preferred formulation of GCL 6 which includes zinc oxide, stannic oxide, graphite, or polytetrafluoroethylene (PTFE) particles, the concentration of zinc oxide is in a range of approximately between 1%–3% w/w, the concentration of stannic oxide is in a range of approximately between 17%–21% w/w, the concentration of carbon black particles is in a range of approximately between 0.4%–0.8% w/w, and the concentration of PTFE particles is in a range of approximately between 5%–7% w/w. Preferably, the thickness of the gloss control layer 6 is in a range of approximately between 0.0003 inch–0.0020 inch, and more preferably 0.0003 inch–0.0010 inch. The thermal conductivity of GCL 6 is preferably in a range of approximately between 0.10 BTU/hr/ft/°F.–0.15 BTU/hr/ft/°F. A ratio $R_{GCL}$, defined as thermal conductivity of GCL 6 divided by thickness of GCL 6, has a preselected value which is preferably in a range of approximately between 600 BTU/hr/ft$^2$/°F.–6,000 BTU/hr/ft$^2$/°F., and more preferably in a range of approximately between 1,200 BTU/hr/ft$^2$/°F.–6,000 BTU/hr/ft$^2$/°F.

The outer surface of the gloss control layer 6 is preferably very smooth and the smoothness can be measured by any known method. Typically the smoothness of GCL 6 can be characterized by a gloss measurement using for example a gloss meter, e.g., a Micro-TRI-Gloss 20-60-85 Glossmeter available from BYK Gardener USA of Rivers Park, Md. A Gardener gloss value is proportional to the intensity of specularly reflected light reflected off a surface divided by the intensity of the incident light for a specified angle of incidence measured from a perpendicular to the surface (angle of incidence equal to the angle of reflection), e.g., at 20, 60, or 85 degrees. Thus, a G60 gloss value is measured at an angle of 60 degrees. A suitable G60 gloss value for the gloss control layer 6 is preferably greater than approximately 9, and more preferably, greater than or equal to approximately 11.

Figure 3:
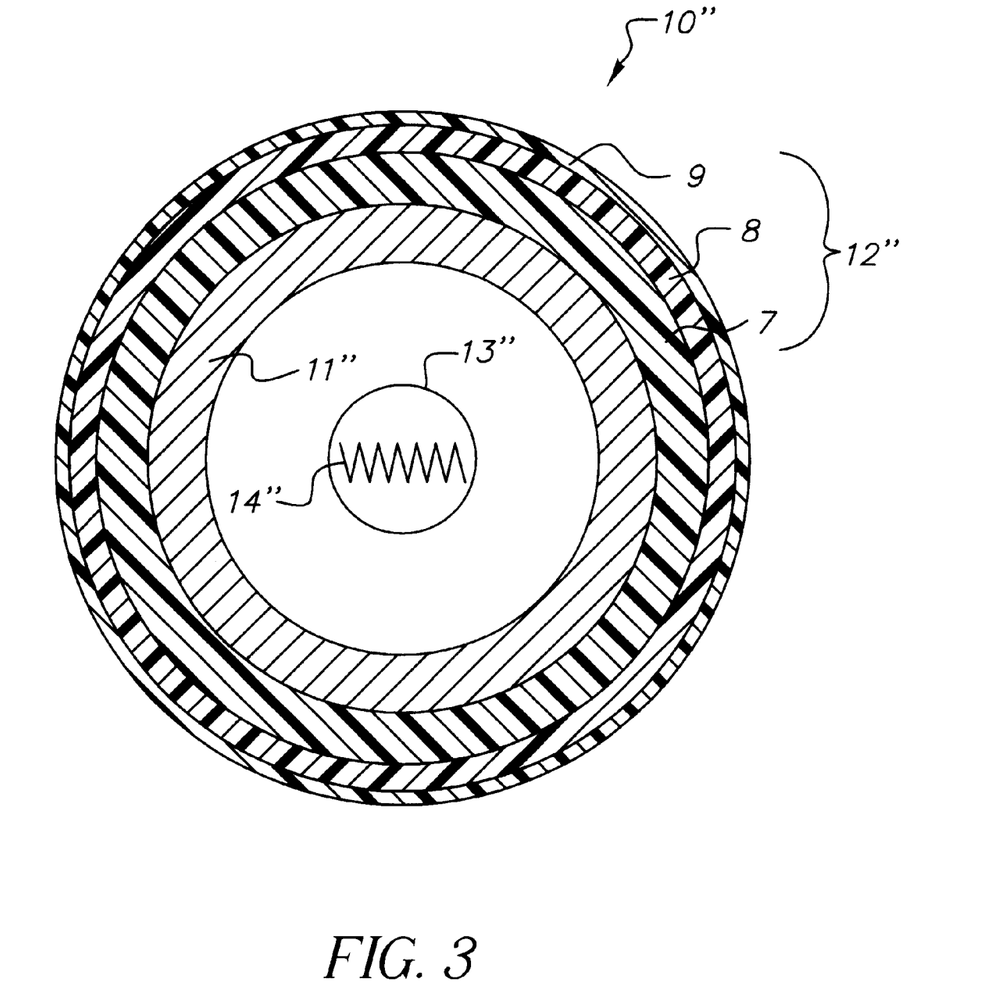
FIG. 3 shows, in an axially directed view, concentric layers of another embodiment of the multilayer externally heated fuser roller of FIG. 1.

Another embodiment 10" of a fuser roller for use in fusing station 100 is illustrated in axial view cross section in FIG. 3. Elements having a double prime (") in FIG. 3 refer to the corresponding unprimed elements in FIG. 1. Fuser roller embodiment 10" does not include a heat storage layer, although embodiment 10" preferably does include a compensatingly thicker heat distribution layer preferably having higher thermal conductivity than the heat distribution layer of the embodiment 10' of FIG. 2, with the other layers of embodiment 10" preferably being similar to those included in fuser roller 10'. Thus, embodiment 10" includes an annular base cushion layer 7 around a rigid cylindrical core member 11", an annular heat distribution layer 8 around the base cushion layer, and a thin outer annular gloss control layer 9 around the heat distribution layer. The layers 7, 8, and 9 are included in the deformable annular structure 12", with roller 10" including a controllable internal optionally activated source of heat such as lamp 13". Core member 11" is preferably entirely similar to core member 11, and it is preferred that layers 7, 8, and 9 are formed by any suitable coating method(s) successively atop one another on the core member 11" as shown.

The composition, thermal properties, and dimensions of base cushion layer 7 are preferably entirely similar to those of base cushion layer 3 of embodiment 10'.

The heat distribution layer (HDL) 8 is preferably made with the same FLC random copolymer of vinylidene fluoride, tetrafluoroethylene and hexafluoropropylene fluorocarbon thermoplastic as the layer 5 of embodiment 10', with layer 8 preferably including one or more fillers. The particle size and composition of a filler included in heat distribution layer 8 are preferably similar to that of layer 5 of embodiment 10', with a filler concentration preferably in a range of approximately between 40%–85% by weight, and more preferably, 50%–75% by weight. Preferably, the thickness of the heat distribution layer 8 is in a range of approximately between 0.005 inch–0.015 inch, and more preferably 0.006 inch–0.012 inch. For embodiment 10", a ratio of a thermal conductivity of the heat distribution layer 8 divided by a thermal conductivity of the base cushion layer 7 has a preselected value greater than approximately 1.5, and more preferably this preselected value is in a range of approximately between 1.5–7. Although a wide range of thermal conductivities can be used to satisfy this requirement, preferably the thermal conductivity of HDL 8 is in a range of approximately between 0.3 BTU/hr/ft/°F.–0.7 BTU/hr/ft/°F., and more preferably 0.35 BTU/hr/ft/°F.–0.45 BTU/hr/ft/°F. A ratio $R'_{HDL}$, defined as thermal conductivity of HDL 8 divided by thickness of HDL 8, has a preselected value which is preferably in a range of approximately between 240 BTU/hr/ft$^2$/°F.14 1680 BTU/hr/ft$^2$/°F., and more preferably in a range of approximately between 350 BTU/hr/ft$^2$/°F.–900 BTU/hr/ft$^2$/°F.

The composition, thermal properties, dimensions, and smoothness of gloss control layer 9 are preferably entirely similar to those of gloss control layer 6 of embodiment 10'.

An advantage of roller 10" over roller 10' is that roller 10" has one layer fewer, and so is simpler and less expensive to manufacture. Also, roller 10" is inherently more reliable, having fewer interfacial bonding requirements between layers and therefore less susceptible to delamination or rupture.

Figure 4:
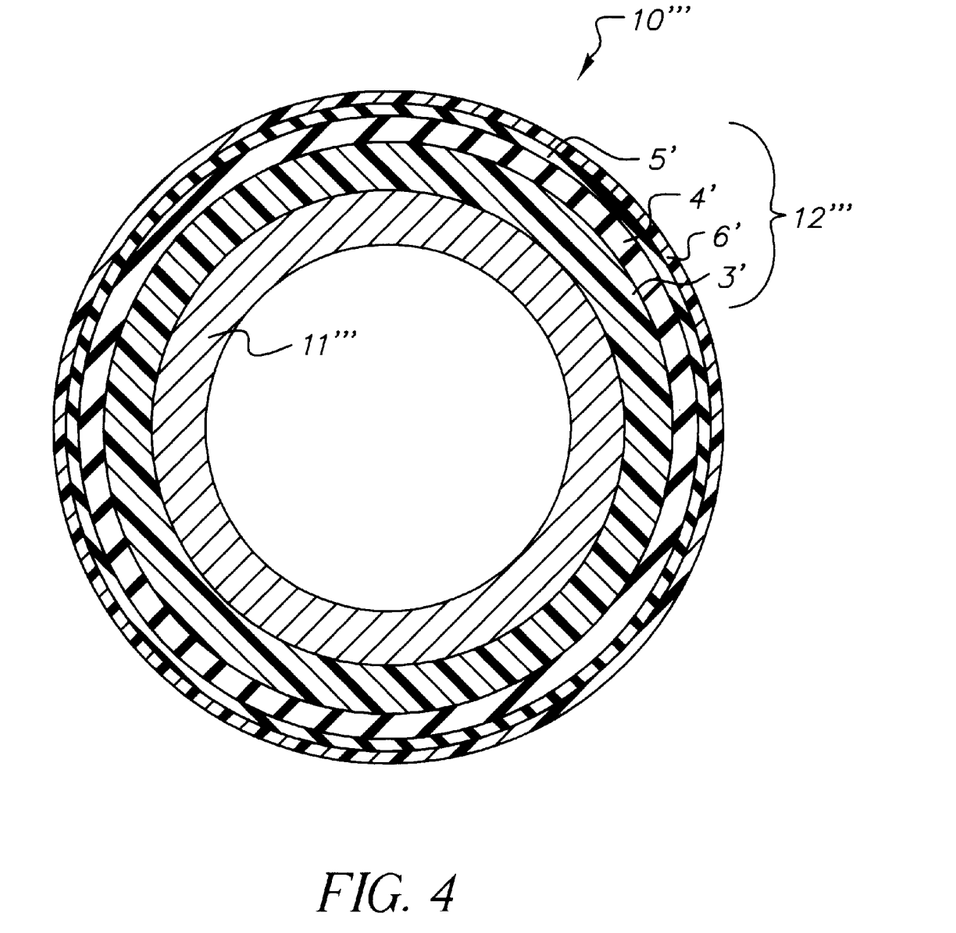
FIG. 4 shows, in an axially directed view, concentric layers of yet another embodiment of the multilayer externally heated fuser roller of FIG. 1.

FIG. 4 illustrates in an axially directed view yet another embodiment, shown as 10''', of a fuser roller for use in fusing station 100. Elements having a triple prime (''') in FIG. 4 refer to the corresponding unprimed elements in FIG. 1, and elements having a single prime (') refer to the corresponding unprimed elements in FIG. 2. Preferably, the thermal properties, compositions and dimensions of the core member 11''', the heat storage layer 4', the heat distribution layer 5' and the gloss control layer 6' are respectively entirely similar to those of core member 11', heat storage layer 4, heat distribution layer 5 and gloss control layer 6 of embodiment 10' of FIG. 2. Also, the outer surface of gloss control layer 6' preferably has a smoothness and glossing ability similar to that of layer 6 of embodiment 10'. It is preferred that layers 3', 4', 5', and 6' are formed by any suitable coating method(s) successively atop one another on the core member 11''' as shown. Fuser roller embodiment 10''' differs from roller 10' by having no internal source of heat. Also, base cushion layer (BCL) 3' differs compositionally from the base cushion layer 3 only as regards the filler. Thermally conductive filler particles are preferably excluded from BCL 3', and also the concentration of a structural filler in BCL 3' is preferably considerably lower than in BCL 3 so as to reduce the thermal conductivity. The particle size and type of structural filler included in BCL 3' are preferably the same as in BCL 3. The concentration of filler in BCL 3' is preferably less than about 10% by weight, and more preferably is in a range of approximately between 1% to 5% by weight. Base cushion layer 3' is relatively thermally insulating (by comparison with BCL 3) and has a thermal conductivity preferably less than or equal to about 0.08 BTU/hr/ft/°F. A ratio R'$_{BCL}$, defined as thermal conductivity of BCL 3' divided by thickness of BCL 3', has a preselected value which is preferably less than approximately 5.3 BTU/hr/ft$^2$/°F., and more preferably less than approximately 3.8 BTU/hr/ft$^2$/°F. In embodiment 10''', a ratio of the thermal conductivity of the heat storage layer 4' divided by the thermal conductivity of the base cushion layer 3' has a preselected value preferably greater than approximately 3.8, and more preferably this preselected value is in a range of approximately between 3.8–8.8. Furthermore, a ratio of a thermal conductivity of the heat distribution layer 5' divided by a thermal conductivity of the base cushion layer 3' has a preselected value preferably greater than approximately 2.5, and more preferably this preselected value is in a range of approximately between 2.5–5.0.

Figure 5:
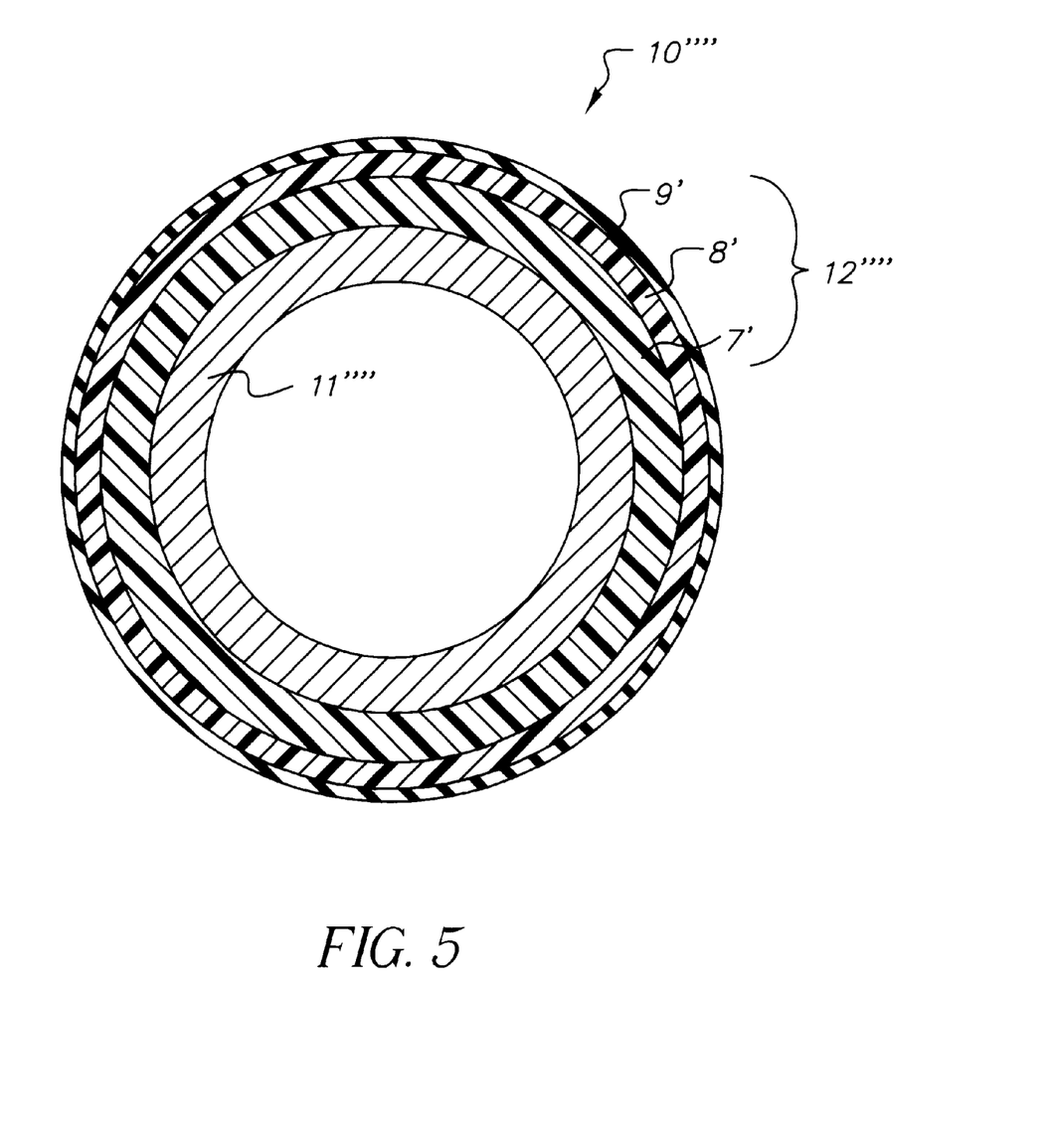
FIG. 5 shows, in an axially directed view, concentric layers of still yet another embodiment of the multilayer externally heated fuser roller of FIG. 1.

FIG. 5 illustrates in an axially directed view still yet another embodiment, shown as 10'''', of a fuser roller for use in fusing station 100. Elements having a quadruple prime ('''') in FIG. 5 refer to the corresponding unprimed elements in FIG. 1, and elements having a single prime (') refer to the corresponding unprimed elements in FIG. 3. Preferably, the thermal properties, compositions and dimensions of the core member 11'''', the heat distribution layer 8' and the gloss control layer 9' are respectively entirely similar to those of core member 11'', heat distribution layer 8 and gloss control layer 9 of embodiment 10'' of FIG. 3. Also, the outer surface of gloss control layer 9' preferably has a smoothness and glossing ability similar to that of layer 9 of embodiment 10''. It is preferred that layers 7', 8', and 9' are formed by any suitable coating method(s) successively atop one another on the core member 11'''' as shown. Fuser roller embodiment 10'''' differs from roller 10'' by having no internal source of heat. Also, base cushion layer (BCL) 7' differs compositionally from the base cushion layer 7 only as regards the filler. The compositional, dimensional, and thermal characteristics of BCL 7' are in all respects similar to the compositional, dimensional, and thermal characteristics disclosed above for BCL 3'. A ratio of the thermal conductivity of the heat distribution layer 8' divided by the thermal conductivity of the base cushion layer 7' preferably has a preselected value of greater than approximately 3.8, and more preferably this preselected value is in a range of approximately between 3.8–8.8.

Fuser roller embodiments 10''' and 10'''' have an advantage over embodiments 10' and 10'', in that the inclusion of the more insulative base cushion layers 3' and 7' and the preferably more thermally conductive heat distribution layers 5' and 8' reduces or suppresses the aforementioned fusing defect called "droop" (caused by cold receivers entering the fusing nip after a stand-by or when a printer is turned on after a shutdown). Not needing an internal source of heat, fuser rollers 10''' and 10'''' are advantageously less costly to make and to operate than rollers 10' and 10''.

EXAMPLES

Example 1

Exemplary Fuser Roller

An exemplary fuser roller similar to that of embodiment 10' of FIG. 2 was made as described below.

A cylindrical aluminum core member of 6.0 inch OD was cleaned with dichloromethane and dried. The core was then primed with a uniform coat of a metal alkoxide type primer, Dow 1200 RTV Prime Coat primer, marketed by Dow Corning Corporation of Midland Mich., and then air-dried. Then 100 parts RTV S5100A, a crosslinkable polydimethylsiloxane incorporating an oxide filler, were blended with 100 parts S5100B curing agent, both components being available from Emerson Cumming Silicones Division of W. R. Grace and Company. The mixture was degassed and injection-molded on the core member and dried. The roller was then cured with a 0.5-hour ramp to 80° C., followed by a 1-hour hold at 80° C., resulting in a condensation-crosslinked base cushion layer having a post-cured thickness of 0.192 inch (after removal of excess solvent). A beat storage layer was then coated directly on to the base cushion layer without the use of a priming interlayer or a subbing interlayer.

The heat storage layer for coating on the base cushion layer was made from Stycast® 4952 polydimethylsiloxane obtained from Grace Specialty Polymers. Then 175 parts by weight of Stycast® 4952 and 0.6 parts by weight of Curative 50 catalyst (from DuPont) were dissolved in 50 parts by weight of methylethylketone and the solution was applied to the base cushion layer via ring coating, then cured for 12 hours at about 210° C., followed by 48 hours at 218° C. in a convection oven. This procedure was repeated to deposit a second coating of the Stycast® 4952, resulting in an addition-crosslinked heat storage layer about 0.008 inch thick. After air-cooling, the heat storage layer was corona discharged for 15 minutes at 750 watts and the heat distribution layer was directly applied.

To form the heat distribution layer for coating on the heat storage layer, 100 parts by weight (w/w) of fluorocarbon thermoplastic random copolymer THV 200A, 10 parts w/w of fluorinated resin particles, 5 parts w/w of zinc oxide (ZnO) particles having diameter of approximately 7 $\mu$m, 100 parts w/w of stannic oxide (SnO$_2$) particles having diameter of approximately 7 $\mu$m, 10 parts w/w amine-functionalized PDMS oil, and 20 parts w/w of graphite particles were mixed. THV200A is a commercially available fluorocarbon thermoplastics random copolymer, which is sold by 3M Corporation. The zinc oxide and stannic oxide particles can be obtained from a convenient commercial source, e.g., Atlantic Equipment Engineers of Bergenfield, N.J. The amine-functionalized PDMS oil is commercially available from United Chemical under the trade name PS510. The fluorinated resin in the form of PTFE particles is commercially available from DuPont under the trade name PTFE MP1600. The graphite particles are commercially available from the Dixon Ticonderoga Compant of Burnet, Tex. under the trade name HPN-2. The formulation was mixed with 2 parts w/w of Curative 50 catalyst (from duPont) on a two-roll mill, and then dissolved to form a 25-weight percent solids solution in methyl ethyl ketone. The resulting material was ring coated onto the cured Stycast® 4952 layer, air dried for 16 hours, baked with 2.5 hour ramp to 275° C., given a 30 minutes soak at 275° C., then held 2 hours at 260° C. The ring coating and curing procedure was repeated two more times using the methyl ethyl ketone solution, resulting in a heat storage layer of fluorocarbon random copolymer having a thickness of about 0.0015 inch, a thermal conductivity of 0.33 BTU/hr/ft/°F., and a G60 gloss of 0.9.

To form the gloss control layer on the heat storage layer, 100 parts by weight (w/w) of fluorocarbon thermoplastic random copolymer THV 200A, 10 parts w/w of PTFE particles, 3 parts w/w of zinc oxide particles having diameter of approximately 7 $\mu$m, 30 parts w/w of stannic oxide particles having diameter of approximately 7 $\mu$m, 1 part w/w carbon black, and 10 parts w/w aminosiloxane were mixed. THV200A is a commercially available fluorocarbon thermoplastics random copolymer, which is sold by 3M Corporation. The zinc oxide particles and stannic oxide particles can be obtained from a convenient commercial source, e.g., Atlantic Equipment Engineers of Bergenfield, N.J. The amino-siloxane was Whitford's Amino, an amine-functionalized PDMS oil which is commercially available from Whitford. The fluorinated resin in the form of PTFE particles is commercially available from DuPont under the trade name PTFE MP1100. The carbon black particles (added for coloring purpose) are commercially available from Thermax. The formulation was mixed with 2 parts w/w of Curative 50 catalyst (from duPont) on a two-roll mill, and then dissolved to form a 25-weight percent solids solution in methyl ethyl ketone. The resulting material was ring coated directly onto the cured heat distribution layer, air dried for 16 hours, baked with 2.5 hour ramp to 275° C., given a 30 minutes soak at 275° C., then held 2 hours at 260° C. The ring coating and curing procedure resulted in an outermost gloss control layer of fluorocarbon random copolymer having a thickness of about 0.0005 inch, a thermal conductivity of 0.13 BTU/hr/ft/°F., and a G60 gloss of 11.5. The completed fuser roller was tested as described below.

Testing of Exemplary Fuser Roller

The exemplary fuser roller made as described above was tested in an apparatus similar to fusing station 100, at a process speed of about 450 mm/sec through the fusing station (equivalent to approximately 70 receiver sheets, with the dimensions of 8.5"×11", per minute). Full color toner images were fused to 11"×17" paper receiver member sheets. Sequential runs of 100 prints were made, starting with the temperature of the fuser roller surface at approximately 170° C., and reducing this temperature by 2° C. for each successive run until cold offset was observed, i.e., when melted toner material became visibly attached to the fuser roller due to insufficiently high fusing temperature (improper penetration of fused toner into the paper fibers). Two different weights of smooth clay-coated paper were tested, i.e., 118 grams/m$^2$ and 216 grams/m$^2$ Spectrotech Lustro Laser papers from Sappi North America. The fusing nip width was 15.3 mm, and both air skives (shown as 61 and 62 in FIG. 1) were on. The results are shown in Table 1.

TABLE 1

| | Cold Offset Tests | | | |
| --- | --- | --- | --- | --- |
| | Comparison Roller | | Example Roller (This Invention) | |
| Paper | Fuser Temperature | Heating Temperature | Fuser Temperature | Heating Temperature |
| 118 g/m$^2$ | 160° C. | 260° C. | 148° C. | 230° C. |
| 216 g/m$^2$ | 160° C. | 260° C. | 150° C. | 230° C. |

In Table 1, the fuser temperature is the steady state temperature of the fuser roller surface, and the heating temperature is the temperature of the heating rollers. The comparison roller had a core member, a base cushion layer coated on the core member, and a heat storage layer coated on the base cushion layer, each of these layers being substantially the same as in the example roller. In the comparison roller, the heat distribution layer was omitted. Furthermore, the comparison roller had an FLC-type gloss control layer of thickness 0.002" coated directly on the heat storage layer, with the FLC-type gloss control layer having a composition disclosed in the Chen et al. patent application (U.S. patent application Ser. No. 09/609,561, filed Jun. 30, 2000).

From Table 1 it is seen that the comparison fuser roller can be operated without cold offset for both weights of paper with a fuser roller surface temperature of 160° C. This surface temperature is entirely similar to that of a fuser roller used in a comparative fusing station of a well-known commercial color printer, employing polyester toners similar to those used for this Example. Under the same through-put conditions, the fourth column of Table 1 shows that the exemplary fuser roller is considerably more efficient than the comparative roller. Thus the exemplary roller can be operated without cold offset at a surface temperature which is 12° C. lower with the lighter weight paper (and 10° C. lower with the heavier weight paper) than the surface temperature of the comparative roller. Moreover, the fifth column of Table 1 shows that the temperature required of the heating rollers when using the exemplary roller is 30° C. lower for both papers than for the comparative roller.

For all of the runs not exhibiting cold offset, the measured gloss of the color prints was satisfactory. Regardless of the column 5 data in Table 1, the results of column 4 show that the exemplary fuser roller is more efficient at fusing, because the required fuser roller temperature at a process speed of 450 mm/sec is 10° C.–12° C. lower. This means that at 450 mm/sec, the example roller will have a considerably longer life than the comparative roller, it being well known that fuser roller life is shorter the higher the operating temperature. The fact that the heating roller temperature was also reduced by 30° C. is surprisingly advantageous, inasmuch as when operating at 450 mm/sec there is a substantial energy saving and a resulting lower cost for the external heating of the example roller. Moreover, the improved efficiency of the example roller can be taken advantage of by increasing the process speed. It is estimated that the process speed can be increased to approach 600–640 mm/sec, i.e., by using the example roller and increasing the temperature of the heating rollers to approximately 260° C., which would also raise the temperature of the fuser roller to the vicinity of 160° C.

It may therefore be concluded that fusing efficiency and external heat load may be traded off against one another to a considerable extent. Thus, an exemplary fuser roller of the invention can be operated for a similar lifetime and at a similar temperature as the comparison roller described above, with a through-put speed of about 600 mm/sec or more for the exemplary fuser roller as compared to a throughput speed of about 450 mm/sec for the comparison roller. Conversely, the exemplary roller can be used at a process speed of 450 mm/sec and the heating rollers operated at a much lower temperature with the following advantages: reduced energy consumption and cost for heating of the heating rollers; a longer life of the fuser roller; and, a reduced heat load generated by the subject fusing station when used in an electrostatographic printer, thereby creating less heat for disposal, e.g., by an air quality management or air conditioning system for use with the printer.

Notwithstanding the above disclosure, there could also be one or more additional thin layers such as for example subbing layers and adhesive layers included in or sandwiched between the disclosed layers of fuser rollers 10', 10", 10''', and 10'''' of FIGS. 2, 3, 4, and 5, respectively. Alternatively, a stiffening layer such as disclosed in the Chen et al. patent application (U.S. patent application Ser. No. 09/680,138) may be included in the multilayer structure 12 of fuser roller 10 in FIG. 1. Moreover, at least one of the layers of the multilayer structure 12 may be included in a replaceable removable annular sleeve member, such as disclosed for example in the Stack et al. patent application (U.S. patent application Ser. No. 09/680,134).

Furthermore, any embodiment of the subject fuser roller of the invention is also usable in a duplex fusing station.

The relatively thermally insulative nature of the fuser roller of the invention minimizes unwanted heat loss from the surrounding layers to a metal core of the fuser roller. Moreover, the novel heat distribution layer of the subject roller has a sufficiently large thermal conductance so as to allow heat to spread quickly into an area where heat has been removed by a fused receiver member. The heat distribution layer nevertheless is suitably thin so as not to make the outer portion of the fuser roller too stiff, which would have a negative effect on both nip width and the ability to release a fused receiver member from the fusing station rollers. When the subject fuser roller includes a heat storage layer, the formulation of the fuser roller is advantageous in that the S5100 and EC4952 rubbers used for the base cushion and heat storage layers respectively are compatible materials, allowing the fuser roller to be formulated by ring-coating the EC-4952 directly on a molded S5100 layer without a need for a priming interlayer or a subbing interlayer. The same coating advantage applies to the coatings of the heat distribution layer and the outermost gloss control layer, inasmuch as these layers are also mutually compatible and thus require no priming interlayers or subbing interlayers.

In summary, in improving over prior art, the subject fuser roller having a relatively thermally conductive heat distribution layer around a relatively thermally insulating base cushion layer gives a greatly improved heat transfer advantage for fusing toner images to receiver members in a fusing station of the invention, while providing suitable glossing of the fused toner by the outermost gloss control layer. This improved heat transfer advantage can be utilized to provide a high productivity (throughput rate) of the fusing station for a given nominal fusing temperature as required by a given type of toner particles and type of receiver member, with throughput speeds approaching a range of about 600–640 mm/sec, equivalent to about 140–150 standard receiver sheets (with the dimensions of 8.5"×11") per minute. Alternatively, the improved heat transfer advantage permits the process speed to be reduced, thereby allowing a reduced external heating load from the external source of heat, e.g., a lower temperature for external heating rollers. Operating external heating rollers at a lower temperature advantageously lowers the cost of power required for fusing, increases the life of the fuser roller, and reduces the heat load to be handled by an air management control apparatus which can further include an air conditioning system.

The invention has been described in detail with particular reference to certain preferred embodiments thereof, but it will be understood that variations and modifications can be effected within the spirit and scope of the invention.

What is claimed is:

1. For use in an electrostatographic machine for forming a toner image on a receiver member, a fusing station for fusing a toner image to a receiver member, said fusing station including a fuser roller operated in conjunction with a pressure roller, said fuser roller heated by at least a source of heat external to said fuser roller, said fuser roller being elastically deformable and engaged under pressure with said pressure roller so as to form a fusing nip therebetween, said pressure roller relatively harder than said fuser roller, said toner image on said receiver member moved through said fusing nip for said fusing, said fuser roller comprising:

a rigid, cylindrical, core member;

a multilayer in the shape of a deformable annular structure around said core member, said deformable annular structure including an elastomeric base cushion layer innermost around said core member, an elastomeric heat storage layer around said base cushion layer, an elastomeric heat distribution layer around said heat storage layer, and a thin flexible outermost gloss control layer around said heat distribution layer;

wherein thermal conductivity of said heat storage layer is greater than thermal conductivity of said base cushion layer;

wherein thermal conductivity of said heat distribution layer is at least as great as thermal conductivity of said base cushion layer;

wherein said base cushion layer is characterized by a preselected value of a ratio of said thermal conductivity of said base cushion layer divided by a thickness of said base cushion layer;

wherein said heat storage layer is characterized by a preselected value of a ratio of said thermal conductivity of said heat storage layer divided by a thickness of said heat storage layer;

wherein said heat distribution layer is characterized by a preselected value of a ratio of said thermal conductivity of said heat distribution layer divided by a thickness of said heat distribution layer;

wherein said gloss control layer is characterized by a preselected value of a ratio of said thermal conductivity of said gloss control layer divided by a thickness of said gloss control layer;

wherein a ratio of said thermal conductivity of said heat storage layer divided by said thermal conductivity of said base cushion layer has a preselected value; and wherein a ratio of said thermal conductivity of said heat distribution layer divided by said thermal conductivity of said base cushion layer has a preselected value.

2. The fuser roller of claim 1, wherein:

said thermal conductivity of said base cushion layer is less than approximately 0.2 BTU/hr/ft/°F.; and said thickness of said base cushion layer is in a range of approximately between 0.180 inch–0.250 inch.

3. The fuser roller of claim 2, wherein:

said thermal conductivity of said base cushion layer is less than approximately 0.1 BTU/hr/ft/°F.; and said thickness of said base cushion layer is in a range of approximately between 0.190 inch–0.195 inch.

4. The fuser roller of claim 1, wherein said preselected value of said ratio of said thermal conductivity of said base cushion layer divided by said thickness of said base cushion layer is $R_{BCL}$, which $R_{BCL}$ is less than approximately 13.3 BTU/hr/ft$^2$/°F.

5. The fuser roller of claim 4, wherein $R_{BCL}$ is less than approximately 6.7 BTU/hr/ft$^2$/°F.

6. The fuser roller of claim 1, wherein said base cushion layer is an elastomeric material comprising less than 30% by weight of a particulate filler including a structural filler, said particulate filler including particles having sizes in a range of approximately between 0.1 μm–20 μm, said particles including at least one of the following types: mineral silica particles, fumed silica particles, or iron oxide particles.

7. The fuser roller according to claim 1, wherein, when said external heat source is the only heat source:

said preselected value of said ratio of said thermal conductivity of said base cushion layer divided by said thickness of said base cushion layer is R'BCL, which R'BCL is less than approximately 5.3 BTU/hr/ft2/°F.; and said thermal conductivity of said base cushion layer is less than or equal to about 0.08 BTU/hr/ft/°F.

8. The fuser roller according to claim 7, wherein $R'_{BCL}$ has a value less than approximately 3.8 BTU/hr/ft$^2$/°F.

9. The fuser roller of claim 1, wherein said preselected value of said ratio of said thermal conductivity of said heat storage layer divided by said thermal conductivity of said base cushion layer is greater than approximately 1.5.

10. The fuser roller of claim 9, wherein said preselected value is in a range of approximately between 1.5–7.

11. The fuser roller of claim 1, wherein, when said external heat source is the only heat source, said thermal conductivity of said heat storage layer divided by said thermal conductivity of said base cushion layer is a ratio having a preselected value greater than approximately 3.8.

12. The fuser roller of claim 11, wherein said preselected value is in a range of approximately between 3.8–8.8.

13. The fuser roller of claim 1, wherein:

said thermal conductivity of said heat storage layer is in a range of approximately between 0.3 BTU/hr/ft/°F.–0.7 BTU/hr/ft/°F.; and said thickness of said heat storage layer is in a range of approximately between 0.006 inch–0.012 inch.

14. The fuser roller of claim 13, wherein:

said thermal conductivity of said heat storage layer is in a range of approximately between 0.32 BTU/hr/ft/°F.–0.45 BTU/hr/ft/°F.; and said thickness of said heat storage layer is in a range of approximately between 0.0075 inch–0.0085 inch.

15. The fuser roller of claim 1, wherein said preselected value of said ratio of said thermal conductivity of said heat storage layer divided by said thickness of said heat storage layer is $R_{HSL}$, which $R_{HSL}$ is in a range of approximately between 300 BTU/hr/ft$^2$/°F.–1,400 BTU/hr/ft$^2$/°F.

16. The fuser roller of claim 15, wherein $R_{HSL}$ is in a range of approximately between 450 BTU/hr/ft$^2$/°F.–720 BTU/hr/ft$^2$/°F.

17. The fuser roller of claim 1, wherein said heat storage layer is an elastomeric material comprising a particulate filler, said particulate filler including at least one of the following oxides: aluminum oxide, iron oxide, calcium oxide, magnesium oxide, nickel oxide, tin oxide, or zinc oxide.

18. The fuser roller of claim 17, wherein:

said particulate filler occupies about 10 to 60 volume percent of said heat storage layer; and said particulate filler includes particles having a mean diameter in a range of approximately between 0.1 micrometer–100 micrometers.

19. The fuser roller of claim 18, wherein:

said particulate filler occupies about 20 to 40 volume percent of said heat storage layer; and said particulate filler includes particles having a mean diameter in a range of approximately between 0.5 micrometer–40 micrometers.

20. The fuser roller of claim 18, wherein:

said thermal conductivity of said heat distribution layer is in a range of approximately between 0.25 BTU/hr/ft/°F.–0.35 BTU/hr/ft/°F.; and said thickness of said heat distribution layer is in a range of approximately between 0.0010 inch–0.0020 inch.

21. The fuser roller of claim 1, wherein:

said thermal conductivity of said heat distribution layer is in a range of approximately between 0.2 BTU/hr/ft/°F.–0.4 BTU/hr/ft/°F.; and said thickness of said heat distribution layer is in a range of approximately between 0.001 inch–0.004 inch.

22. The fuser roller of claim 1, wherein said preselected value of said ratio of said thermal conductivity of said heat distribution layer divided by aid thickness of said heat distribution layer is $R_{HDL}$, which $R_{HDL}$ is in a range of approximately between 600 BTU/hr/ft$^2$/°F.–4,800 BTU/hr/ft$^2$/°F.

23. The fuser roller of claim 22, wherein $R_{HDL}$ is in a range of approximately between 1,500 BTU/hr/ft$^2$/°F.–4,200 BTU/hr/ft$^2$/°F.

24. The fuser roller of claim 23, wherein:

said particulate filler has a particle size in a range of approximately between 0.1 $\mu$m–2.0 $\mu$m; and said particulate filler has a total concentration in said heat distribution layer in a range of approximately between 50%–60% by weight.

25. The fuser roller of claim 1, wherein said preselected value of said ratio of said thermal conductivity of said heat distribution layer divided by said thermal conductivity of said base cushion layer is greater than 1.

26. The fuser roller of claim 25, wherein said preselected value is in a range of approximately between 1–4.

27. The fuser roller of claim 1, wherein, when said external heat source is the only heat source:

said preselected value of said ratio of said thermal conductivity of said heat distribution layer divided by said thermal conductivity of said base cushion layer is greater than approximately 1.5.

28. The fuser roller of claim 27, wherein said preselected value is in a range of approximately between 1.5–7.

29. The fusing station of claim 28, wherein said pressure roller includes:

a rigid, cylindrical, core member comprising aluminum;

an annular resilient base cushion layer around the core member, said base cushion layer comprising a condensation-crosslinked polydimethylsiloxane elastomer including filler particles; and an annular outer layer around the base cushion layer, said outer layer comprising a fluorocarbon thermoplastic random copolymer of vinylidene fluoride, tetrafluoroethylene and hexafluoropropylene.

30. The fuser roller of claim 1, wherein said heat distribution layer comprises a fluoropolymer.

31. The fuser roller of claim 30, wherein said fluoropolymer is a random copolymer of vinylidene fluoride, tetrafluoroethylene, and hexafluoropropylene, said random copolymer having subunits of:

—(CH2CF2)x-, —(CF2CF(CF3))y-, and —(CF2CF2)z-, wherein, x is from 1 to 50 or 60 to 80 mole percent of vinylidene fluoride, y is from 10 to 90 mole percent of hexafluoropropylene, z is from 10 to 90 mole percent of tetrafluoroethylene, and x+y+z equals 100 mole percent.

32. The fuser roller of claim 1, wherein:

said heat distribution layer comprises a particulate filler having a particle size in a range of approximately between 0.1 $\mu$m–10 $\mu$m; and said particulate filler has a total concentration in said heat distribution layer in a range of approximately between 40%–70% by weight.

33. The fuser roller of claim 1, wherein said heat distribution layer comprises a particulate filler including zinc oxide, stannic oxide, graphite, or polytetrafluoroethylene particles.

34. The fuser roller of claim 33, wherein in said heat distribution layer said zinc oxide particles have a concentration in a range of approximately between 1%–3% by weight, said stannic oxide particles have a concentration in a range of approximately between 35%–45% by weight, said graphite particles have a concentration in a range of approximately between 6%–10% by weight, and said polytetrafluoroethylene particles have a concentration in a range of approximately between 3%–5% by weight.

35. The fuser roller of claim 1, wherein, when said external heat source is the only heat source:
said heat distribution layer includes a particulate filler;
said thermal conductivity of said heat distribution layer is in a range of approximately between 0.3 BTU/hr/ft/°F.–0.7 BTU/hr/ft/°F.;
said thickness of said heat distribution layer is in a range of approximately between 0.005 inch–0.015 inch; and
said particulate filler has a total concentration in said heat distribution layer in a range of approximately between 40%–85% by weight.

36. The fuser roller of claim 35, wherein:
said thermal conductivity of said heat distribution layer is in a range of approximately between 0.35 BTU/hr/ft/°F.–0.45 BTU/hr/ft/°F.;
said heat distribution layer is in a range of approximately between 0.006 inch–0.012 inch; and
said particulate filler has a total concentration in said heat dstribution layer in a range of approximately between 50%–75% by weight.

37. The fuser roller of claim 1, wherein, when said external heat source is the only heat source:
said preselected value of said ratio of said thermal conductivity of said heat distribution layer divided by said thickness of said heat distribution layer is R'HDL, which R'HDL is in a range of approximately between 340 BTU/hr/ft2/°F.–1680 BTU/hr/ft2/°F.

38. The fuser roller of claim 37, wherein R'$_{HDL}$ is in a range of approximately between 350 BTU/hr/ft$^2$/° F.–900 BTU/hr/ft$^2$/°F.

39. The fuser roller of claim 1, wherein:
said thermal conductivity of said gloss control layer is in a range of approximately between 0.1 BTU/hr/ft/°F.–0.15 BTU/hr/ft/°F.;
said thickness of said gloss control layer is in a range of approximately between 0.0003 inch–0.0020 inch; and
said gloss control layer has a G60 gloss value greater than approximately 9.

40. The fuser roller of claim 39, wherein:
said thickness of said gloss control layer is in a range of approximately between 0.0003 inch–0.0010 inch; and
said gloss control layer has a G60 gloss value greater than approximately 11.

41. The fuser roller of claim 1, wherein said preselected value of said ratio of said thermal conductivity of said gloss control layer divided by said thickness of said gloss control layer is RGCL, which RGCL is in a range of approximately between 600 BTU/hr/ft2/°F.–6,000 BTU/hr/ft2/°F.

42. The fuser roller of claim 41, wherein R$_{GCL}$ is in a range of approximately between 1,200 BTU/hr/ft$^2$/°F.–6,000 BTU/hr/ft$^2$/°F.

43. The fuser roller of claim 1, wherein said gloss control layer comprises a fluoropolymer.

44. The fuser roller of claim 43, wherein said fluoropolymer is a random copolymer of vinylidene fluoride, tetrafluoroethylene, and hexafluoropropylene, said random copolymer having subunits of:

$$—(CH_2{}_{CF2})x\text{-}, —(CF_2CF(CF_3))y\text{-}, \text{ and } —(CF_2CF_2)z\text{-},$$

wherein,
x is from 1 to 50 or 60 to 80 mole percent of vinylidene fluoride,
y is from 10 to 90 mole percent of hexafluoropropylene,
z is from 10 to 90 mole percent of tetrafluoroethylene, and
x+y+z equals 100 mole percent.

45. The fuser roller of claim 1, wherein said gloss control layer comprises a particulate filler.

46. The fuser roller of claim 45, wherein:
said particulate filler has a particle size in a range of approximately between 0.1 μm–10 μm; and
said particulate filler has a total concentration in said gloss control layer in a range of approximately between 15%–35% by weight.

47. The fuser roller of claim 45, wherein:
said particulate filler has a particle size in a range of approximately between 0.1 μm–2.0 μm; and
said particulate filler has a total concentration in said gloss control layer in a range of approximately between 20%–30% by weight.

48. The fuser roller of claim 45, wherein said particulate filler includes zinc oxide, stannic oxide, carbon black, or polytetrafluoroethylene particles.

49. The fuser roller of claim 48, wherein in said gloss control layer said concentration of zinc oxide is in a range of approximately between 1%–3% by weight, the concentration of stannic oxide is in a range of approximately between 17%–21% by weight, the concentration of carbon black particles is in a range of approximately between 0.4%–0.8% by weight, and the concentration of polytetrafluoroethylene particles is in a range of approximately between 5%–7% by weight.

50. The fuser roller of claim 1, wherein said fuser roller further comprises a removable replaceable annular sleeve member, which sleeve member includes at least one of the layers included in said annular structure.

51. The fuser roller of claim 1, wherein:
said base cushion layer comprises an addition-crosslinked polydimethylsiloxane;
said heat storage layer comprises a condensation-crosslinked polydimethylsiloxane;
said heat storage layer comprises a random copolymer of vinylidene fluoride, tetrafluoroethylene, and hexafluoropropylene; and
said gloss control layer comprises a random copolymer of vinylidene fluoride, tetrafluoroethylene, and hexafluoropropylene.

52. The fuser roller of claim 1, wherein said gloss control layer comprises a chemically unreactive, low surface energy, flexible, polymeric material suitable for high temperature use.

53. For use in an electrostatographic machine for forming a toner image on a receiver member, a fusing station for fusing said toner image to said receiver member, said fusing station comprising:
a fuser roller operated in conjunction with a pressure roller, said fuser roller heated by a source of heat external to said fuser roller and an auxiliary intermittently activated internal source of heat, said fuser roller being elastically deformable and engaged under pressure with said pressure roller so as to form a fusing nip therebetween, said pressure roller relatively harder than said fuser roller, said toner image on said receiver member moved through said fusing nip for said fusing;

wherein said fuser roller includes a rigid, cylindrical, core member; a multilayer in the shape of a deformable annular structure around said core member, said deformable annular structure including an elastomeric base cushion layer innermost around said core member, an elastomeric heat storage layer around said base cushion layer, a polymeric heat distribution layer around said heat storage layer, and a thin flexible outermost gloss control layer around said heat storage layer;

wherein a thermal conductivity of said heat storage layer is higher than a thermal conductivity of said base cushion layer;

wherein a thermal conductivity of said heat distribution layer is at least as high as a thermal conductivity of said base cushion layer;

said source of heat external to said fuser roller is provided by at least one controllably heated, hard, thermally conductive roller in contact with said fuser roller;

said auxiliary intermittently activated internal source of heat for said fuser roller is provided by a controllably operated lamp located within a hollow interior of said core member; and said gloss control layer has a G60 gloss value greater than approximately 9.

54. The fusing station according to claim 53, wherein:

said thermal conductivity of said base cushion layer divided by a thickness of said base cushion layer is characterized by a ratio RBCL, said ratio RBCL having a preselected value less than approximately 13.3 BTU/hr/ft2/°F.;

said thermal conductivity of said heat storage layer divided by a thickness of said heat storage layer is characterized by a ratio RHSL, said ratio RHSL having a preselected value in a range of approximately between 300 BTU/hr/ft2/°F.–1,400 BTU/hr/ft2/°F.;

said thermal conductivity of said heat distribution layer divided by a thickness of said heat distribution layer is characterized by a ratio RHDL, said ratio RHDL having a preselected value in a range of approximately between 600 BTU/hr/ft2/°F.–4,800 BTU/hr/ft2/°F.;

a thermal conductivity of said gloss control layer divided by a thickness of said gloss control layer is characterized by a ratio RGCL, said ratio RGCL having a preselected value in a range of approximately between 600 BTU/hr/ft2/°F.–6,000 BTU/hr/ft2/°F.;

said thermal conductivity of said base cushion layer is less than approximately 0.2 BTU/hr/ft/°F.;

said thermal conductivity of said heat storage layer is in a range of approximately between 0.3 BTU/hr/ft/°F.–0.7 BTU/hr/ft/°F.;

said thermal conductivity of said heat distribution layer is in a range of approximately between 0.2 BTU/hr/ft/°F.–0.4 BTU/hr/ft/°F.;

said thermal conductivity of said gloss control layer is in a range of approximately between 0.10 BTU/hr/ft/°F.–0.15 BTU/hr/ft/°F.;

said thermal conductivity of said heat storage layer divided by said thermal conductivity of said base cushion layer is a ratio having a preselected value greater than approximately 1.5; and said thermal conductivity of said heat distribution layer divided by said thermal conductivity of said base cushion layer is a ratio having a preselected value greater than 1.

55. The fusing station according to claim 54 wherein:

said auxiliary intermittently activated internal source of heat is inactive or removed;

said thermal conductivity of said base cushion layer divided by a thickness of said base cushion layer is characterized by a ratio R'BCL, said ratio R'BCL having a preselected value less than approximately 5.3 BTU/hr/ft2/°F.;

said thermal conductivity of said base cushion layer is less than or equal to approximately 0.08 BTU/hr/ft/°F.;

said thermal conductivity of said heat storage layer divided by said thermal conductivity of said base cushion layer is a ratio having a preselected value greater than approximately 3.8; and said thermal conductivity of said heat distribution layer divided by said thermal conductivity of said base cushion layer is a ratio having a preselected value greater than approximately 2.5.

56. The fusing station of claim 53, further comprising:

at least one heating roller in direct contact with said fuser roller, said at least one heating roller being said source of heat external to said fuser roller;

a heating-roller-cleaning station; and an oiling roller mechanism including a release-agent-donor roller for applying a liquid release agent to said fuser roller.

57. For use in an electrostatographic machine for forming a toner image on a receiver member, a fusing station for fusing said toner image to said receiver member, said fusing station comprising:

a fuser roller operated in conjunction with a pressure roller, said fuser roller heated by a source of heat external to said fuser roller;

said fuser roller being elastically deformable and engaged under pressure with said pressure roller so as to form a fusing nip therebetween, said pressure roller relatively harder than said fuser roller, said toner image on said receiver member moved through said fusing nip for said fusing;

wherein said fuser roller includes a rigid, cylindrical core member, said deformable annular structure including an elastomeric base cushion layer innermost around said core member, a polymeric heat distribution layer around said base cushion layer, and a thin flexible outermost gloss control layer around said heat distribution layer;

said thermal conductivity of said base cushion layer divided by a thickness of said base cushion layer is characterized by a ratio RBCL, said ratio RBCL having a preselected value less than approximately 13.3 BTU/hr/ft2/°F.;

said thermal conductivity of said heat distribution layer divided by a thickness of said heat distribution layer is characterized by a ratio RHDL, said ratio RHDL having a preselected value in a range of approximately between 240 BTU/hr/ft2/°F.–1,680 BTU/hr/ft2/°F.;

a thermal conductivity of said gloss control layer divided by a thickness of said gloss control layer is characterized by a ratio RGCL, said ratio RGCL having a preselected value in a range of approximately between 600 BTU/hr/ft2/°F.–6,000 BTU/hr/ft2/°F.;

said thermal conductivity of said base cushion layer is less than approximately 0.2 BTU/hr/ft/°F.;

said thermal conductivity of said heat distribution layer is in a range of approximately between 0.3 BTU/hr/ft/°F.–0.7 BTU/hr/ft/°F.;

said thermal conductivity of said gloss control layer is in a range of approximately between 0.10 BTU/hr/ft/°F.–0.15 BTU/hr/ft/°F.; and said thermal conductivity of said heat distribution layer divided by said thermal conductivity of said base cushion layer is a ratio having a preselected value greater than approximately 1.5.

58. The fusing station according to claim 57 wherein:

said thermal conductivity of said base cushion layer divided by a thickness of said base cushion layer is characterized by a ratio R'BCL, said ratio R'BCL having a preselected value less than approximately 5.3 BTU/hr/ft2/°F.;

said thermal conductivity of said base cushion layer is less than or equal to approximately 0.08 BTU/hr/ft/°F.;

said thermal conductivity of said heat distribution layer divided by said thermal conductivity of said base cushion layer is a ratio having a preselected value greater than approximately 3.8.

* * * * *